US011543717B2

(12) United States Patent
Zhang et al.

(10) Patent No.: US 11,543,717 B2
(45) Date of Patent: Jan. 3, 2023

(54) DISPLAY PANEL AND DISPLAY DEVICE

(71) Applicant: TCL China Star Optoelectronics Technology Co., Ltd., Guangdong (CN)

(72) Inventors: Yu Zhang, Shenzhen (CN); Sijia Wu, Shenzhen (CN); Miao Jiang, Shenzhen (CN)

(73) Assignee: TCL China Star Optoelectronics Technology Co., Ltd., Guangdong (CN)

( * ) Notice: Subject to any disclaimer, the term of this patent is extended or adjusted under 35 U.S.C. 154(b) by 39 days.

(21) Appl. No.: 15/734,780

(22) PCT Filed: Nov. 20, 2020

(86) PCT No.: PCT/CN2020/130354
§ 371 (c)(1),
(2) Date: Dec. 3, 2020

(87) PCT Pub. No.: WO2022/068021
PCT Pub. Date: Apr. 7, 2022

(65) Prior Publication Data
US 2022/0100042 A1    Mar. 31, 2022

(30) Foreign Application Priority Data

Sep. 29, 2020   (CN) .......................... 202011050741.2

(51) Int. Cl.
*G02F 1/1362* (2006.01)
*G02F 1/1368* (2006.01)
*G02F 1/1333* (2006.01)

(52) U.S. Cl.
CPC .... *G02F 1/136222* (2021.01); *G02F 1/13338* (2013.01); *G02F 1/13685* (2021.01); *G02F 1/136209* (2013.01)

(58) Field of Classification Search
CPC .......... G02F 1/136222; G02F 1/13338; G06F 3/042; G06F 3/0304; G06F 3/0412
See application file for complete search history.

(56) References Cited

U.S. PATENT DOCUMENTS 7,863,966 B1 *  1/2011  Chuang ................... G06F 3/042
                                                    327/517
2005/0045804 A1  3/2005  Park et al.
(Continued)

FOREIGN PATENT DOCUMENTS

CN    105573000 A    5/2016
CN    106526943 A    3/2017
(Continued)

*Primary Examiner* — Alexander P Gross
(74) *Attorney, Agent, or Firm* — PV IP PC; Wei Te Chung; Ude Lu

(57) ABSTRACT

A display panel and a display device are provided. The display panel includes an array substrate, an opposite substrate, and a liquid crystal layer between the array substrate and the opposite substrate. The array substrate is located above the opposite substrate near a light emerging side of the display panel. A photosensitive device is disposed inside the assay substrate, and a path for the photosensitive device to receive ambient light avoids a color resist layer in the display panel. The photosensitive device is not affected by the color resist layer when receiving infrared light from the outside, which can eliminate red spots on a display screen.

12 Claims, 4 Drawing Sheets

(56) References Cited

U.S. PATENT DOCUMENTS

| | | | |
|---|---|---|---|
| 2011/0001725 A1* | 1/2011 | Kurokawa | G06F 3/04166 345/82 |
| 2011/0198484 A1* | 8/2011 | Kurokawa | H01L 27/1225 250/214 R |
| 2012/0050654 A1* | 3/2012 | Kim | G06F 3/042 257/435 |
| 2013/0027857 A1* | 1/2013 | Jeong | G02F 1/133512 361/679.01 |
| 2018/0174552 A1* | 6/2018 | Zhang | H01L 31/109 |
| 2020/0150480 A1 | 5/2020 | Song et al. | |
| 2020/0193126 A1* | 6/2020 | Shi | G02F 1/1368 |

FOREIGN PATENT DOCUMENTS

| | | |
|---|---|---|
| CN | 107256061 A | 10/2017 |
| CN | 108376686 A | 8/2018 |
| CN | 109521590 A | 3/2019 |
| CN | 110515226 A | 11/2019 |
| CN | 111399292 A | 7/2020 |
| CN | 111694180 A | 9/2020 |
| KR | 20030058719 A | 7/2003 |

* cited by examiner

DISPLAY PANEL AND DISPLAY DEVICE

FIELD OF INVENTION

The present disclosure relates to the technical field of display, and particularly, to a display panel and a display device.

BACKGROUND OF INVENTION

With the continuous development of display technology, more and more additional functions have been integrated into the display device. From original push-button mobile phones to today's smart touch mobile phones, methods of human-mobile phone interaction have been drastically changed. The method of sense control interaction may become the next generation of the methods of human-mobile phone interaction, and has potential application value.

The conventional method of sense control interaction mainly comprises voice control, light sensing, etc. The method of sense control interaction using near-infrared emission and near-infrared reception are mainly applied to distance sensors. The sensor used as a separate module needs to occupy a certain space, and may only achieve a single function of distance detection, such as remote light interaction, whiteboard education, novel display technology, etc. As shown in FIG. 1, an infrared sense control display panel 100 comprises an array substrate 101, a liquid crystal layer 102, and a color filter substrate. A surface of the array substrate 101 is provided with a light sensor 1011. The color filter substrate comprises a substrate 1031, a blue color resist 1032 on a surface of the substrate 1031, a green color resist 1033, and a red color resist 1034. When the infrared emission tube emits red light 104, and the red light 104 reaches the blue color resist 1032 and the green color resist 1033, part of the red light 104 is absorbed, and the red light 1041 passing through the red color resist 1034 arrives at the light sensor 1011, resulting in a relatively small detection range of the light sensor 1011. Therefore, the sensitivity of the light sensor 1011 is poor. As shown in FIG. 2, after the red light is incident, the blue color resist 1032 and the green color resist 1033 do not allow red light to enter, and the red light can only pass through the red color resist 1034. A red spot 1051 appears on a display screen 105 corresponding to the red color resist 1034. A shape of the red spots 1051 is rectangular, forming a bright spot on the screen and resulting in image errors.

Based on the above, it is necessary to design a novel display panel to solve the problem that the light sensor is integrated on one side of the array substrate in the related art, the infrared range collected by the light sensor is relatively small, and the infrared light that passes through the red color resist forms a light spot on the screen, which causes errors of the screen image and affects display quality of the screen.

SUMMARY OF INVENTION

Technical Problems

The embodiments of the present disclosure provide a display panel and a display device, which may solve the problem that the light sensor is integrated on one side of the array substrate in the related art, the infrared range collected by the light sensor is relatively small, and the infrared light that passes through the red color resist forms a light spot on the screen, which causes errors of the screen image and affects display quality of the screen.

Technical Solutions

To solve the problems mentioned above, technical solutions provided by the present disclosure are as follows:

The embodiments of the present disclosure provide a display panel, which comprises an array substrate, an opposite substrate, and a liquid crystal layer between the array substrate and the opposite substrate. The array substrate is located above the opposite substrate near a light emerging side of the display panel, a photosensitive device is disposed inside the assay substrate, and a path for the photosensitive device to receive ambient light avoids a color resist layer in the display panel.

According to one preferred embodiment of the present disclosure, the array substrate is a color filter-on-array (COA) type array substrate, and the color resist layer is disposed in the array substrate and located below the photosensitive device.

According to one preferred embodiment of the present disclosure, the array substrate comprises a base, a first dielectric layer on the base, the color resist layer on the first dielectric layer, light-shielding layers respectively near both lateral sides of the color resist layer, a pixel electrode on the color resist layer, a second dielectric layer on the pixel electrode, a source and a drain on the second dielectric layer, an active layer on the source and the drain, a gate insulating layer on the active layer, a gate on the gate insulating layer, and a package cover on the gate.

According to one preferred embodiment of the present disclosure, the light-shielding layer comprises a first light-shielding layer and a second light-shielding layer. The source comprises a first source and a second source. The drain comprises a first drain and a second drain. The active layer comprises a first active layer and a second active layer, the gate comprises a first gate and a second gate. The first light-shielding layer, the first source, the first drain, the first active layer, and the first gate form the photosensitive device. The second light-shielding layer, the second source, the second drain, and the second active layer, and the second gate form a driving thin film transistor (TFT).

According to one preferred embodiment of the present disclosure, the first gate is the photosensitive layer, and the first gate comprises a photoresistor.

According to one preferred embodiment of the present disclosure, the photoresistor comprises at least one of cadmium sulfide, selenium, aluminum sulfide, lead sulfide, and bismuth sulfide. A spectral peak of the photoresistor is within a range between 520 nm and 600 nm.

According to one preferred embodiment of the present disclosure, the first gate further comprises a first sensing electrode and a second sensing electrode, and the photoresistor is located between the first sensing electrode and the second sensing electrode.

According to one preferred embodiment of the present disclosure, the photosensitive device is electrically connected to a touch circuit. The photosensitive device converts infrared light into a current signal, and the touch circuit transmits the current signal to a touch chip.

According to one preferred embodiment of the present disclosure, the touch circuit further comprises the driving TFT, a reset TFT, a storage capacitor, an integrator, and the touch chip. The photosensitive device, the driving TFT, and the reset TFT are all top-gate thin film transistors. The gate of the photosensitive device is electrically connected to a fourth voltage. The source of the photosensitive device is electrically connected to a third voltage. The drain of the photosensitive device is electrically connected to the source of the driving TFT. The gate of the driving TFT is electrically connected to a second voltage. The drain of the driving TFT is electrically connected to an input terminal of the integrator, an output terminal of the integrator is electrically connected to the touch chip. A gate of the reset TFT is electrically connected to a first voltage. A source and a drain of the reset TFT are respectively electrically connected to the input terminal and the output terminal of the integrator.

According to one preferred embodiment of the present disclosure, the photosensitive device, the driving TFT, the reset TFT, the storage capacitor, and the integrator are all provided with a ground terminal.

According to one preferred embodiment of the present disclosure, the integrator comprises an adjusting resistor, an amplifier, and a feedback capacitor.

According to one preferred embodiment of the present disclosure, the pixel electrode is electrically connected to the second source.

According to one preferred embodiment of the present disclosure, the opposite substrate comprises a glass substrate, a common electrode on the glass substrate, and a transparent polyimide film on the common electrode.

According to one preferred embodiment of the present disclosure, the first light-shielding layer and the second light-shielding layer are both black matrixes.

According to one preferred embodiment of the present disclosure, a material of the second gate is one material or combinations of molybdenum, copper, and aluminum.

According to one preferred embodiment of the present disclosure, the array substrate is a non-COA type array substrate, and the color resist layer is disposed in the opposite substrate.

According to the display panel described above, embodiments of the present disclosure provides a display device, which comprises a display panel and a backlight located on a back of the display panel. The display panel comprises an array substrate, an opposite substrate, and a liquid crystal layer between the array substrate and the opposite substrate. The array substrate is located above the opposite substrate near a light emerging side of the display panel, a photosensitive device is disposed inside the assay substrate, a path for the photosensitive device to receive ambient light avoids a color resist layer in the display panel, and the backlight is attached to one side of the opposite substrate of the display panel.

According to one preferred embodiment of the present disclosure, the array substrate is a color filter-on-array (COA) type array substrate, and the color resist layer is disposed in the array substrate and located below the photosensitive device.

According to one preferred embodiment of the present disclosure, the photosensitive device is a top-gate thin film transistor. A gate of the photosensitive device is a photosensitive layer. The photosensitive layer comprises a photoresistor. The photoresistor comprises at least one of cadmium sulfide, selenium, aluminum sulfide, lead sulfide, and bismuth sulfide, and a spectral peak of the photoresistor is within a range between 520 nm and 600 nm.

According to one preferred embodiment of the present disclosure, the array substrate is a non-COA type array substrate, and the color resist layer is disposed in the opposite substrate.

Beneficial Effects

The embodiments of the present disclosure provide a display panel and a display device. The display panel comprises an array substrate, an opposite substrate, and a liquid crystal layer between the array substrate and the opposite substrate. The array substrate is located above the opposite substrate near a light emerging side of the display panel. A photosensitive device is disposed inside the assay substrate, and a path for the photosensitive device to receive ambient light avoids a color resist layer in the display panel. The photosensitive device is not affected by the color resist layer when receiving infrared light from the outside, which may enhance the sensitivity of the photosensitive layer, eliminate red spots on a display screen, thereby enhancing the display quality of the screen.

BRIEF DESCRIPTION OF DRAWINGS

In order to explain the technical solutions of the present disclosure more clearly, the following will briefly introduce the drawings used in the description of the embodiments or the related art. Obviously, the drawings described below are only some embodiments of the present disclosure. For those skilled in the art, other drawings can be obtained based on these drawings without making creative efforts.

DETAILED DESCRIPTION OF PREFERRED EMBODIMENTS

The technical solutions of the present disclosure will be described clearly and completely in combined with the drawings of the present disclosure. Obviously, the described embodiments are only one part of the embodiments of the present disclosure, but not all of the embodiments. Based on the embodiments of the present disclosure, all other embodiments obtained by a person skilled in the art without making creative efforts fall within the claim scope of the present disclosure.

The present disclosure is designed based on the related art that a light sensor is integrated on one side of an array substrate. The infrared range collected by the light sensor is relatively small, and the infrared light that passes through a red color resist form a light spot on the screen, which causes errors of the screen image and affects display quality of the screen. The present disclosure may solve the defects.

The embodiments of the present disclosure provide a display panel and a display device. The display panel comprises an array substrate, an opposite substrate, and a liquid crystal layer between the array substrate and the opposite substrate. The array substrate is located above the opposite substrate near a light emerging side of the display panel. A photosensitive device is disposed inside the assay substrate, and a path for the photosensitive device to receive ambient light avoids a color resist layer in the display panel. The photosensitive device is not affected by the color resist layer when receiving infrared light from the outside, which may enhance the sensitivity of the photosensitive layer, eliminate red spots on a display screen, thereby enhancing the display quality of the screen.

Figure 1:
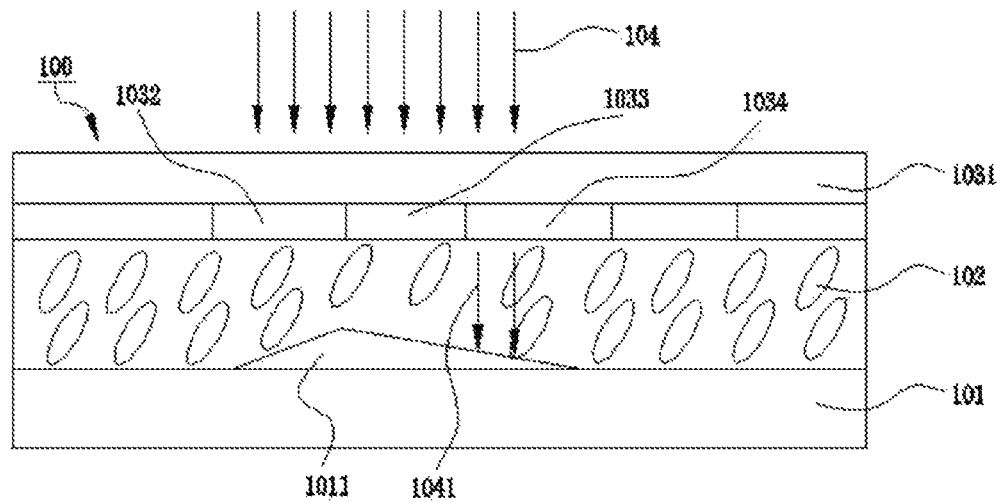
FIG. 1 is a schematic structural view of a photosensitive display panel structure in the related art.
Figure 2:
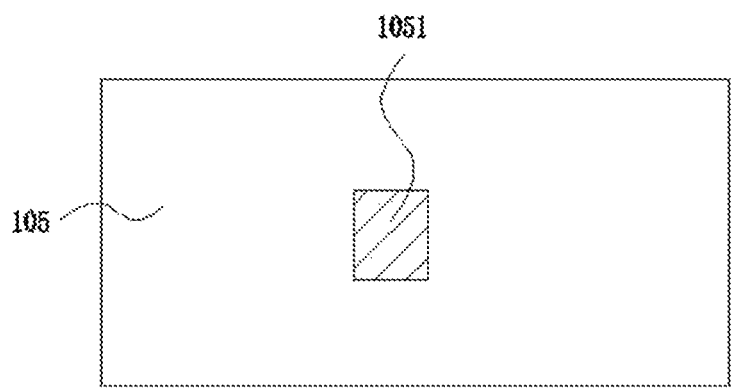
FIG. 2 is a schematic structural view of a light spot appeared at a light sensing position in the photosensitive display panel in the related art.
Figure 3:
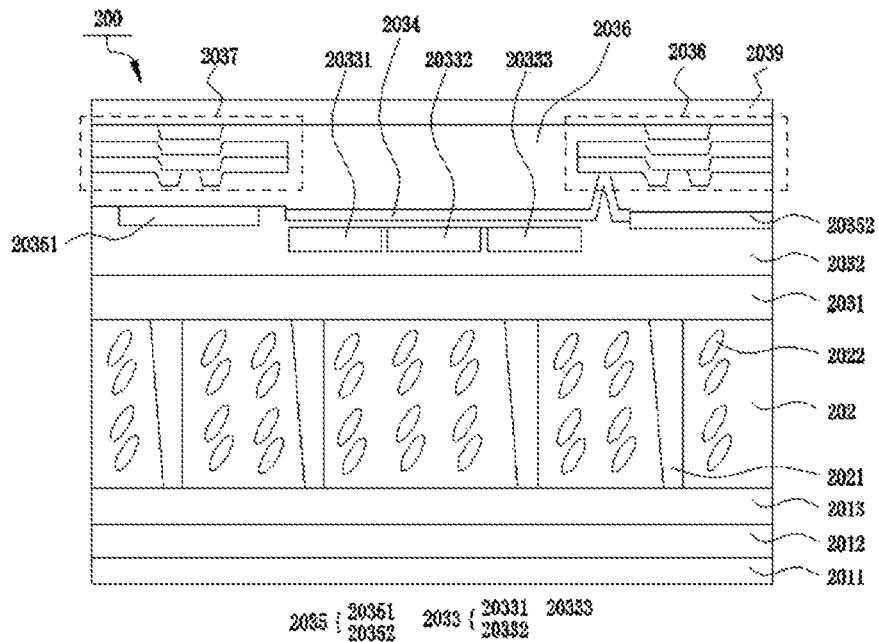
FIG. 3 is a schematic structural view of a display panel provided by one embodiment of the present disclosure.
Figure 4:
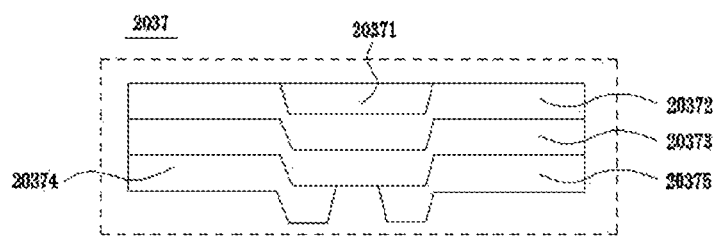
FIG. 4 is a schematic structural view of a partial photosensitive device of the display panel provided by one embodiment of the present disclosure.
Figure 5:
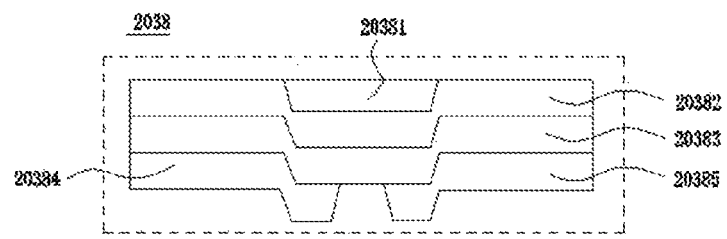
FIG. 5 is a schematic structural view of a partial driving TFT of the display panel provided by one embodiment of the present disclosure.

As shown in FIG. 3, FIG. 4, and FIG. 5, an embodiment of the present disclosure provides a schematic structural view of a film layer of a display panel. The display panel 200 comprises an array substrate, an opposite substrate, and a liquid crystal layer 202 between the array substrate and the opposite substrate. The array substrate is located above the opposite substrate near a light emerging side of the display panel 202. Preferably, the array substrate is a color filter-on-array (COA) type array substrate. The color resist layer 2033 is disposed in the array substrate and located below the photosensitive device 2037.

The array substrate comprises a base 2031, a first dielectric layer 2032 on the base 2031, the color resist layer 2033 on the first dielectric layer 2032, light-shielding layers 2035 respectively near both lateral sides of the color resist layer 2033, a pixel electrode 2034 on the color resist layer 2033, a second dielectric layer 2036 on the pixel electrode 2034, a photosensitive device 2037 and a driving thin film transistor (TFT) 2038 on the second dielectric layer 2036, and a package cover 2039 on the photosensitive device 2037 and the driving TFT 2038. The photosensitive device 2037 and the driving TFT 2038 are disposed in the same layer, preferably to be a top-gate thin film transistor.

As shown in FIG. 4 and FIG. 5, a source and a drain, an active layer on the source and the drain, a gate insulating layer on the active layer, a gate on the gate insulating layer are disposed on the second dielectric layer 2036. The light-shielding layer 2035 comprises a first light-shielding layer 20351 and a second light-shielding layer 20352. The gate comprises a first gate 20371 and a second gate 20381. The gate insulating layer comprises a first gate insulating layer 20372 and a second gate insulating layer 20382. The active layer comprises a first active layer 20373 and a second active layer 20383. The source comprises a first source 20374 and a second source 20384. The drain comprises a first drain 20375 and a second drain 20385. The first light-shielding layer 20351, the first gate 20371, the first gate insulating layer 20372, the first active layer 20373, the first source 20374, and the first drain 20375 form the photosensitive device. The second light-shielding layer, 20352, the second gate 20381, the second gate insulating layer 20382, the second active layer 20383, second source 20384, the second drain 20385 form the driving TFT. The liquid crystal layer 202 comprises a liquid crystal 2022 and a spacer support 2021. The opposite substrate comprises a glass substrate 2011, a common electrode 2012 on the glass substrate 2011, and a transparent polyimide film 2013 on the common electrode 2012. The common electrode 2012 and the pixel electrode 2034 form an electric field, and the electric field drives the liquid crystal 2022 in the liquid crystal layer 202 to deflect.

The pixel electrode 2034 is electrically connected to a source of the driving TFT 2038. The photosensitive device 2037 and the driving TFT 2038 are both thin film transistors in a touch circuit. Moreover, the driving TFT 2038 is also the driving TFT of a pixel circuit in a liquid crystal panel. Preferably, the light-shielding layer 30351 and the second light-shielding layer 30352 are black matrixes.

The color resist layer 2033 comprises a blue color resist 20331, a green color resist 20332, and a red color resist 20333 disposed at intervals. When an infrared light is incident on a surface of the display panel, the photosensitive device 2037 above the color resist layer 3033 may directly receive the infrared light without being affected by the blue color resist 20331, the green color resist 20332, and the red color resist 20333, which may enhance the sensitivity of the photosensitive device 2037, eliminate the red spots on the display screen, thereby enhancing the display quality of the display panel.

Figure 6:
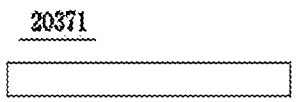
FIG. 6 is a schematic structural view of a gate of the photosensitive device of the display panel provided by one embodiment of the present disclosure.
Figure 7:
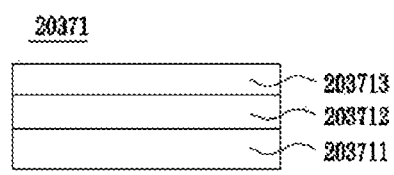
FIG. 7 is a schematic structural view of another gate of the photosensitive device of the display panel provided by one embodiment of the present disclosure.

As shown in FIG. 4 and FIG. 6, a structural film layer of a part of the photosensitive device 2037 is shown as follows, which comprises a first gate 20371, a first gate insulating layer 20372 located below the first gate 20371, a first active layer 20373 located below the first gate insulating layer 20372, and a first source 20374 and a first drain 20375 attached to both lateral sides of the first active layer 20373. In order to achieve that the photosensitive device 2037 may receive the infrared light and convert the infrared light into an identifiable signal source, the first gate 20371 is a photosensitive layer that receives the external infrared light. Preferably, a material of the first gate 20371 is a metal pattern prepared by a photoresistor. The metal pattern comprises at least one metal material or combination of cadmium sulfide, selenium, aluminum sulfide, lead sulfide, and bismuth sulfide. A spectral peak of the photoresistor is within a range between 520 nm and 600 nm. As shown in FIG. 7, in another embodiment, the first gate 20371 adopts a laminated film layer, and comprises a first sensing electrode 203711, a second sensing electrode 203713, and a photosensitive spacer 203712 located between the first sensing electrode 203711 and the second sensing electrode 203713. The photosensitive spacer 203712 is made of cadmium sulfide or cadmium selenide.

The specific manufacturing method of the photosensitive device 2037 is as follows: the substrate is preferably a transparent cover, and a first gate 20371 is prepared on the substrate after cleaning with sulfuric acid or water. The first gate 20371 serves as a photosensitive touch layer. A superimposed layer of SiN layer and SiO layer is deposited on the substrate. The superimposed layer covers the gate 20371. After exposure, wet etching, and photoresist stripping, the entire first gate insulating layer 20372 is prepared. A first active layer 20373 is prepared on the first gate insulating layer. A material of the first active layer 20373 is one material or more materials of indium gallium zinc oxide, indium zinc tin oxide, and indium gallium zinc tin oxide. The first active layer 20373 is patterned by a yellow light process. In the present embodiment, a thickness of the first active layer 20373 ranges from 5 to 500 nm. After the deposition of the first active layer 20373 is completed, an annealing process is performed. The annealing process may be performed at 400° C. in a dry air atmosphere for about 0.5 hours. After the annealing process is completed, the first active layer 20373 is etched by a wet etching process or by a dry etching process using oxalic acid used as an etching solution. After the etching process, a film of the entire metal oxide layer of the first active layer 20373 is patterned to form an island-shaped metal oxide semiconductor layer. The first source 20374 and the first drain 20375 are respectively prepared on two lateral sides of a surface of the first active layer 20373. The first source 20374 is attached and electrically connected to a surface of a source doped region of the first active layer. The first drain 20375 is attached and electrically connected to a surface of a drain doped region of the first active layer. After the photosensitive device 2037 is prepared, the photosensitive device 2037 is reversely disposed in the second insulating layer 2032.

Figure 8:
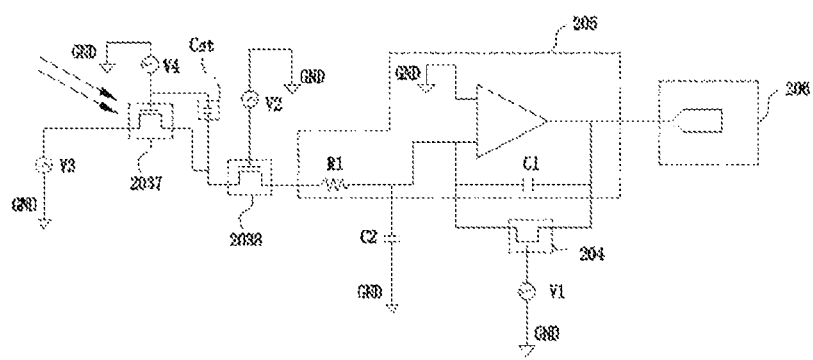
FIG. 8 is a circuit connection view of a touch circuit provided by one embodiment of the present disclosure.

When the first gate 20371 is irradiated with the infrared light, a resistance of the photosensitive material in the first gate 20371 is changed, and then an amount of charge on the first gate 20371 is changed. An electric field force generated on a channel region of the first active layer 20373 is changed, and a current flowing between the first source 20374 and the first drain 20375 is changed. It can be seen that the present disclosure converts the infrared light received from the outside into a measurable current, and then uses an integration circuit to convert, amplify and accumulate a current difference of a weak current signal, and sends it to a corresponding touch chip to achieve a remote touch control. It may be applied to projectors, mobile phones, computers, bracelets, and game machines. Refer to FIG. 8 for a specific touch drive circuit.

According to the display panel described above, an embodiment of the present disclosure further provides a touch circuit. As shown in FIG. 8, the touch circuit comprises a photosensitive device 2037, a driving TFT 2038, a reset TFT 204, a storage capacitor Cst, an integrator 205, and a touch chip 206. A gate of the photosensitive device 2037 is electrically connected to a fourth voltage V4. A source of the photosensitive device 2037 is electrically connected to a third voltage V3. A drain of the photosensitive device 2037 is electrically connected to a source of the driving TFT 2038. Two plates of the storage capacitor Cst are respectively electrically connected to the gate and the drain of the photosensitive device 2037. A gate of the driving TFT 2038 is electrically connected to a second voltage V2. A drain of the driving TFT 2038 is electrically connected to an input terminal of the integrator 205. An output terminal of the integrator 205 is electrically connected to the touch chip 206. A gate of the reset TFT 204 is electrically connected to a first voltage V1. A source and a drain of the reset TFT 204 are electrically connected to the input terminal and the output terminal of the integrator 205, respectively. The photosensitive device 2037, the driving TFT 2038, the reset TFT 204, the storage capacitor Cst, and the integrator 205 are all provided with a ground terminal GND. The integration circuit 204 comprises an amplifier, an adjustment resistor R1 connected to an output terminal of the amplifier, and a feedback capacitor C1 located between the output terminal and an input terminal of the amplifier.

In the present embodiment, the photosensitive device 2037, the driving TFT 2038, the reset TFT 204, the storage capacitor Cst, and the integrator 205 are all provided with the ground terminal. The photosensitive device 2037 comprises a substrate and a photosensitive electrode layer on the substrate. The photosensitive electrode layer may change a resistance of the photosensitive electrode layer by changing at least one of a first sensing electrode and a second sensing electrode under light conditions, and further change an amount of charge covered on a gate surface of the photosensitive device 2037, which affects a current value flowing through two lateral sides of the channel region. The integration circuit 204 detects the current value and amplifies the detected current value by an amplifier, and then the current value amplified by n times is sent to the touch chip 206.

The working principle diagram of the touch circuit of one embodiment of the present disclosure is as follows: at an initialization stage, the first voltage V1, the second voltage V2, and the fourth voltage V4 are all at low level, the photosensitive device 2037, the driving TFT 2038, and the reset TFT 204 are turned on, and the photosensitive device 2037 initializes the storage capacitor Cst according to an initial signal input by the third voltage V3. At a sensing stage, the photosensitive device 2037 receives the infrared light, the fourth voltage V4 and the first voltage V1 are both at high level, and the TFT 201 is switched on to disconnect with the reset TFT 204, the second voltage V2 is at low level, the photosensitive device 2037 is turned on, and the photosensitive device 2037 converts the received infrared light into a varied current signal, and stores the current signal in the storage capacitor Cst. At a signal output stage, the four voltages V4 and the first voltage V1 are both at high level, the photosensitive device 2037 and the reset TFT 204 are disconnected, the second voltage V2 is at low level, the TFT 201 is switched on, and the integrator 205 accumulates the electrons in the storage capacitor Cst into the feedback capacitor. An output voltage of the integrator 205 varies with the change of the accumulated electrons on the feedback, and the current signal generated by the change of the accumulated electrons is sent to the touch chip 206 to determine a position of the light on the display panel.

In another embodiment, the array substrate is a non-COA type array substrate, and the color resist layer is disposed in the opposite substrate. Other structures are similar to those in FIG. 3, and no longer be described here.

Figure 9:
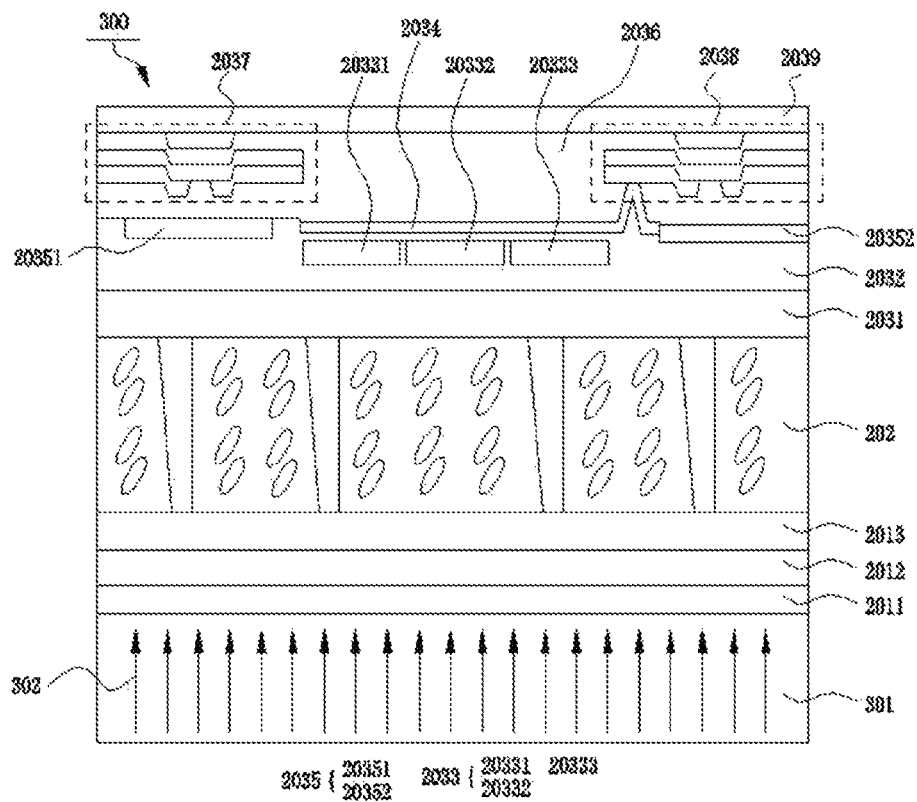
FIG. 9 is a schematic structural view of a display device provided by one embodiment of the present disclosure.

As shown in FIG. 9, according to the display panel 200 described above, the present disclosure further provides a display device 300, which comprises the display panel 200 in the embodiment described above. The display device 300 further comprises a backlight 301. The backlight 301 is attached to one side of the opposite substrate of the display panel 200. There are many types of the backlight 301, and the specific structure is not described here. The backlight 301 emits a vertical light 302. After the vertical light 302 enters a liquid crystal layer 302 through the opposite substrate, is refracted by the liquid crystal layer 302, and passes through the array substrate, the corresponding pictures, words or an animation is displayed on the display screen.

The embodiment of the present disclosure provides the display panel and the display device. The display panel comprises an array substrate, an opposite substrate, and a liquid crystal layer between the array substrate and the opposite substrate. The array substrate is located above the opposite substrate near a light emerging side of the display panel. A photosensitive device is disposed inside the assay substrate, and a path for the photosensitive device to receive ambient light avoids a color resist layer in the display panel. The photosensitive device is not affected by the color resist layer when receiving infrared light from the outside, which may enhance the sensitivity of the photosensitive layer, eliminate the red spots on a display screen, thereby enhancing the display quality of the screen.

In summary, although the present disclosure has been disclosed as above in preferred embodiments, the preferred embodiments described above are not intended to limit the present disclosure. Those of ordinary skill in the art can make various modifications without departing from the spirit and scope of the present disclosure. Therefore, the claimed scope of the present disclosure is based the scope defined by the claims.

What is claimed is:

1. A display panel, comprising:
   an array substrate, an opposite substrate, and a liquid crystal layer between the array substrate and the opposite substrate, wherein the array substrate is located above the opposite substrate near a light emerging side of the display panel, a photosensitive device is disposed inside the array substrate, and a path for the photosensitive device to receive ambient light avoids a color resist layer in the display panel, wherein the array substrate is a color filter-on-array (COA) type array substrate, and the color resist layer is disposed in the array substrate and located below the photosensitive device, wherein the array substrate comprises a base, a first dielectric layer on the base, the color resist layer on the first dielectric layer, light-shielding layers respectively near both lateral sides of the color resist layer, a pixel electrode on the color resist layer, a second dielectric layer on the pixel electrode, a source and a drain on the second dielectric layer, an active layer on the source and the drain, a gate insulating layer on the active layer, a gate on the gate insulating layer, and a package cover on the gate, wherein the light-shielding layers comprise a first light-shielding layer and a second light-shielding layer, the source comprises a first source and a second source, the drain comprises a first drain and a second drain, and the active layer comprises a first active layer and a second active layer, the gate comprises a first gate and a second gate, wherein the first light-shielding layer, the first source, the first drain, the first active layer, and the first gate form the photosensitive device, the second light-shielding layer, the second source, the second drain, and the second active layer, and the second gate form a driving thin film transistor (TFT), wherein the first gate is the photosensitive layer, and the first gate comprises a photoresistor, and wherein the first gate further comprises a first sensing electrode and a second sensing electrode, and the photoresistor is located between the first sensing electrode and the second sensing electrode.

2. The display panel according to claim 1, wherein the photosensitive device is electrically connected to a touch circuit, the photosensitive device converts infrared light into a current signal, and the touch circuit transmits the current signal to a touch chip.

3. The display panel according to claim 2, wherein the touch circuit further comprises a driving TFT, a reset TFT, a storage capacitor, an integrator, and the touch chip, wherein the photosensitive device, the driving TFT, and the reset TFT are all top-gate thin film transistors, and wherein the gate of the photosensitive device is electrically connected to a fourth voltage, the source of the photosensitive device is electrically connected to a third voltage, the drain of the photosensitive device is electrically connected to the source of the driving TFT, the gate of the driving TFT is electrically connected to a second voltage, the drain of the driving TFT is electrically connected to an input terminal of the integrator, an output terminal of the integrator is electrically connected to the touch chip, a gate of the reset TFT is electrically connected to a first voltage, and a source and a drain of the reset TFT are respectively electrically connected to the input terminal and the output terminal of the integrator.

4. The display panel according to claim 3, wherein the photosensitive device, the driving TFT, the reset TFT, the storage capacitor, and the integrator are all provided with a ground terminal.

5. The display panel according to claim 3, wherein the integrator comprises an adjusting resistor, an amplifier, and a feedback capacitor.

6. The display panel according to claim 1, wherein the photoresistor comprises at least one of cadmium sulfide, selenium, aluminum sulfide, lead sulfide, and bismuth sulfide, and a spectral peak of the photoresistor is within a range between 520 nm and 600 nm.

7. The display panel according to claim 1, wherein the pixel electrode is electrically connected to the second source.

8. The display panel according to claim 1, wherein the opposite substrate comprises a glass substrate, a common electrode on the glass substrate, and a transparent polyimide film on the common electrode.

9. The display panel according to claim 1, wherein the first light-shielding layer and the second light-shielding layer are both black matrixes.

10. The display panel according to claim 1, wherein a material of the second gate is one material or combinations of molybdenum, copper, and aluminum.

11. A display device, comprising: a display panel and a backlight located on a back of the display panel, wherein the display panel comprises an array substrate, an opposite substrate, and a liquid crystal layer between the array substrate and the opposite substrate, wherein the array substrate is located above the opposite substrate near a light emerging side of the display panel, a photosensitive device is disposed inside the array substrate, a path for the photosensitive device to receive ambient light avoids a color resist layer in the display panel, and the backlight is attached to one side of the opposite substrate of the display panel, wherein the array substrate is a color filter-on-array (COA) type array substrate, and the color resist layer is disposed in the array substrate and located below the photosensitive device, wherein the array substrate comprises a base, a first dielectric layer on the base, the color resist layer on the first dielectric layer, light-shielding layers respectively near both lateral sides of the color resist layer, a pixel electrode on the color resist layer, a second dielectric layer on the pixel electrode, a source and a drain on the second dielectric layer, an active layer on the source and the drain, a gate insulating layer on the active layer, a gate on the gate insulating layer, and a package cover on the gate, wherein the light-shielding layers comprise a first light-shielding layer and a second light-shielding layer, the source comprises a first source and a second source, the drain comprises a first drain and a second drain, and the active layer comprises a first active layer and a second active layer, the gate comprises a first gate and a second gate, wherein the first light-shielding layer, the first source, the first drain, the first active layer, and the first gate form the photosensitive device, the second light-shielding layer, the second source, the second drain, and the second active layer, and the second gate form a driving thin film transistor (TFT), wherein the first gate is the photosensitive layer, and the first gate comprises a photoresistor, and wherein the first gate further comprises a first sensing electrode and a second sensing electrode, and the photoresistor is located between the first sensing electrode and the second sensing electrode.

12. The display device according to claim 11, wherein the photosensitive device is a top-gate thin film transistor, a gate of the photosensitive device is a photosensitive layer, the photosensitive layer comprises a photoresistor, the photoresistor comprises at least one of cadmium sulfide, selenium, aluminum sulfide, lead sulfide, and bismuth sulfide, and a spectral peak of the photoresistor is within a range between 520 nm and 600 nm.

* * * * *